March 7, 1967      E. R. CONLON      3,307,668
SPRING CLUTCH
Original Filed Sept. 4, 1964
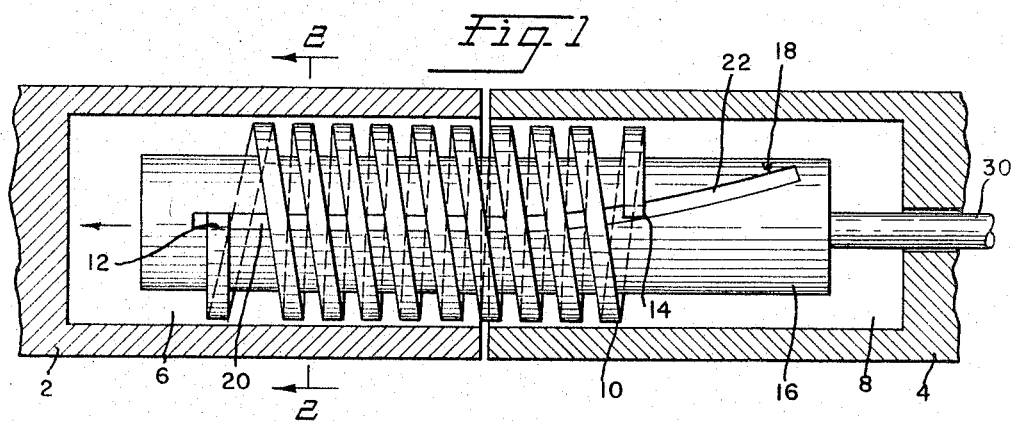
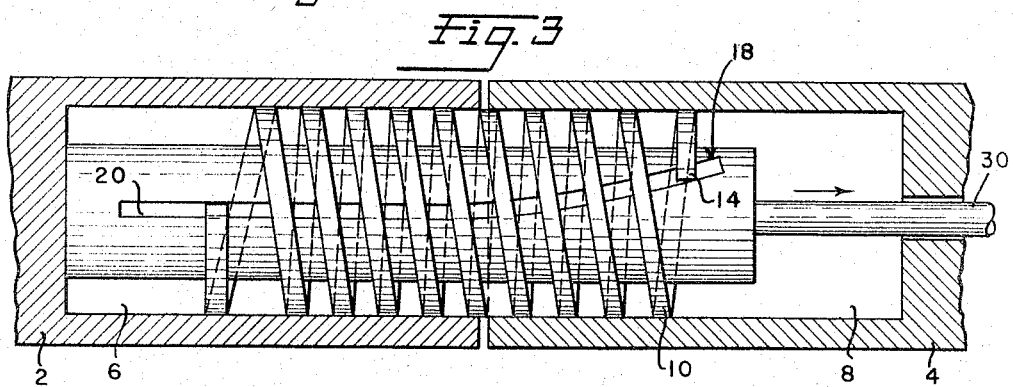
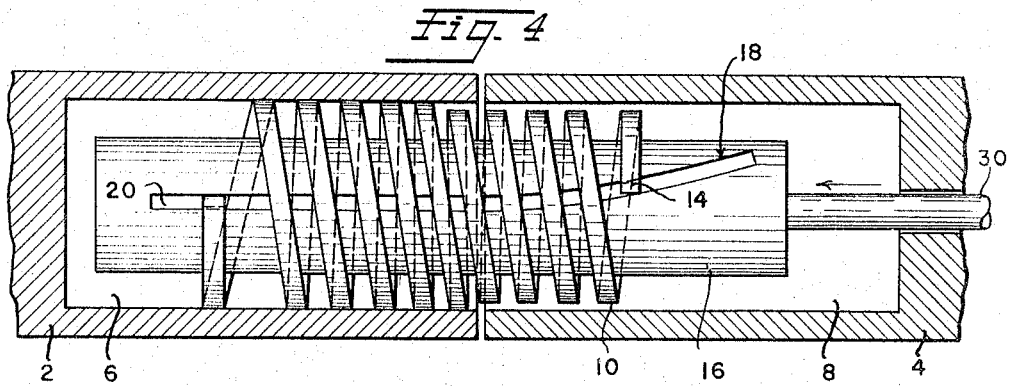
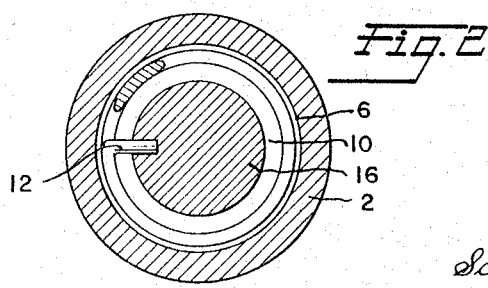
INVENTOR
EDWARD R. CONLON
BY *Scrivener Parker Scrivener & Clarke*
ATTORNEYS

United States Patent Office 3,307,668
Patented Mar. 7, 1967

3,307,668
SPRING CLUTCH
Edward R. Conlon, Bristol, Conn., assignor to Associated Spring Corporation, Bristol, Conn., a corporation of Delaware
Original application Sept. 4, 1964, Ser. No. 394,403. Divided and this application Aug. 5, 1966, Ser. No. 579,451
4 Claims. (Cl. 192—96)

This application is a division of my co-pending application Serial No. 394,403, filed September 4, 1964, for spring clutch.

This invention relates broadly to power transmitting clutches and, more particularly, to those of the type in which a helical spring is associated in co-axial relation with the aligned ends of a drive shaft and an output shaft and may be operated to drivingly connect or disconnect the shafts by being moved radially into and out of frictional engagement with one or both of them.

The principal object of this invention has been to provide a spring clutch of the described type but having a novel construction and mode of operation, by reason of which the clutch has fewer parts than known clutch devices of the same type, has improved efficiency and other operating characteristics, and in which very simple actuating means are provided for changing the diameter of the spring to operate it into and out of driving relation to one or both of the shafts.

The invention is described in the following specification and is illustrated in the accompanying drawings, in which:

FIG. 1 is a part sectional and part elevational view showing drive and driven shafts and a spring clutch according to the invention;

FIG. 2 is a cross sectional view of the clutch shown in FIG. 1, taken on line 2—2 of FIG. 1, and FIGS. 3 and 4 are views similar to FIG. 1 showing two other embodiments of the invention.

In the forms of the invention described in my co-pending application the clutch spring surrounds the ends of the drive and driven shafts and, in the operation of the clutch, is radially contracted or expanded into or out of engagement with one or both of the shafts in the operation of the clutch. However, this surrounding relation of the spring to the shafts is not a necessary relation of the parts in accordance with my invention and, if desired, the clutch spring may be positioned within the aligned ends of the drive and driven shafts and expanded into engagement with one or both of them to effect a driving connection. One embodiment of this form of the invention is disclosed in FIG. 1 of the drawings and comprises the axially aligned, axially spaced end parts of driving and driven shafts 2, 4 these end parts being axially bored as shown at 6, 8. A helical clutch spring 10 is positioned within the two shaft bores with its opposite end parts positioned, respectively, in the two shaft bores, and in this form of the invention the spring has an outside diameter less than the inside diameter of the bore in each of the two shafts and therefore is normally out of engagement with both shafts. The ends of the wire forming the slutch spring are turned radially inwardly forming two tangs 12, 14 and a cylindrical actuating member 16 is positioned within the spring and extends from end to end thereof and has a cam slot 18 in its outer surface, one part 20 of which is straight and extends axially of the actuating member, and a second part 22 of which extends at an angle to the first part. The tangs are received, respectively, in the two parts of the cam slot. Suitable means, which are indicated at 30, are provided for imparting axial movement to the actuator and it will be apparent that such movement in the direction of the arrow in FIG. 1 will cause relative circumferential movement of the tangs, causing the spring to expand radially throughout its length into engagement with the inner surfaces of the two shaft bores, thus drivingly connecting the two shafts. Release of the driving connection may, of course, be made by movement of the operator in the direction opposite to that required to cause driving connection.

In the embodiment of the invention disclosed in FIG. 1 and described above, the driving and driven shafts are normally disconnected and are connected by operation of the actuator to cause the clutch spring to be expanded into engagement with both of them. In a second embodiment of the invention, which is disclosed in FIG. 3, the two shafts are normally connected by the clutch spring which, in this form of the invention, is normally in tight engagement throughout its outer periphery with the inner surfaces of the two bores in the drive and driven shafts. In this form of the invention, axial movement of the actuator in one direction, i.e. the direction of the arrow in FIG. 2, causes the ends of the spring to be moved circumferentially with respect to each other in such directions as to cause the spring to contract and move out of engagement with the two shafts, thereby disconnecting them. Shaft connection may, of course, be restored by movement of the actuator in the opposite direction.

In a further form which the invention may take the clutch spring is normally connected to one shaft and disconnected from the other, this embodiment being illustrated in FIG. 4 of the drawings. The driving and driven shafts are therefore normally disconnected and may be connected by movement of the actuator in one direction, i.e. the direction of the arrow in FIG. 4, and disconnected by movement of the actuator in the other direction, driving connection being made when both ends of the clutch spring are in engagement with the shafts.

While I have described and illustrated certain forms which my invention may take, it will be apparent to those skilled in the arts to which it relates that other embodiments, as well as modifications of those disclosed, may be made and practiced without departing in any way from the spirit or scope of the invention, for the limits of which reference must be made to the appended claims.

What is claimed is:

1. A clutch for connecting and disconnecting two aligned relatively rotatable hollow ended shafts, comprising a helical coil spring extending between the shafts and having its end parts within the hollow ends of the shafts, an actuator positioned within the spring and being movable axially of the spring and shafts, said actuator having means engaging the ends of the spring and operable on axial movement of the actuator to produce relative circumferential movement of the spring ends thereby to change the radial dimension of at least part of the spring.

2. A clutch device according to claim 1, in which the outer periphery of the spring is normally spaced from the inner walls of both shafts.

3. A clutch device according to claim 1, in which the outer periphery of the spring normally engages the inner walls of both shafts.

4. A clutch device according to claim 1, in which the outer periphery of the spring normally engages the inner wall of one shaft and is spaced from the inner wall of the other shaft.

References Cited by the Examiner

UNITED STATES PATENTS

| | | |
|---|---|---|
| 2,242,379 | 5/1941 | Wahl. |
| 2,548,747 | 4/1951 | Starkey _____ 192—41 |
| 2,698,678 | 1/1955 | Dale et al. _____ 192—81 X |
| 2,895,578 | 7/1959 | Winchell _____ 192—81 X |

DAVID J. WILLIAMOWSKY, *Primary Examiner.*

A. T. McKEON, *Assistant Examiner.*